United States Patent [19]

Yamada et al.

[11] 4,444,899

[45] Apr. 24, 1984

[54] PROCESS FOR THE PRODUCTION OF LOW DENSITY ACTIVATED ALUMINA FORMED PRODUCT

[75] Inventors: Koichi Yamada, Niihama; Kunio Nakazato, Yokohama; Katsuzo Shiraishi; Seiichi Hamano, both of Niihama, all of Japan

[73] Assignee: Sumitomo Aluminum Smelting Company, Limited, Osaka, Japan

[21] Appl. No.: 481,461

[22] Filed: Apr. 1, 1983

Related U.S. Application Data

[63] Continuation of Ser. No. 254,449, Apr. 15, 1981, abandoned.

[30] Foreign Application Priority Data

Apr. 21, 1980 [JP] Japan .................................. 55-53375

[51] Int. Cl.$^3$ ...................... B01J 21/04; B01J 21/08; B01J 21/12
[52] U.S. Cl. ....................................... 502/64; 502/80; 502/243; 502/252; 502/263; 502/349; 502/351; 502/355; 502/439; 423/628
[58] Field of Search .......................... 252/455 R, 463; 423/628; 502/64, 80, 243, 252, 263, 349, 351, 355, 439

[56] References Cited

U.S. PATENT DOCUMENTS

| | | | |
|---|---|---|---|
| 3,184,414 | 5/1965 | Koch et al. | 252/455 R |
| 3,943,064 | 3/1976 | Ballain et al. | 252/455 R |
| 4,045,372 | 8/1977 | Warthen et al. | 252/463 |
| 4,120,942 | 10/1978 | Spitzer et al. | 423/628 X |

*Primary Examiner*—W. J. Shine
*Attorney, Agent, or Firm*—Birch, Stewart, Kolasch and Birch

[57] ABSTRACT

An improved process for the production of a low density formed product of an activated alumina having a large macro-pore volume and an excellent abrasion resistance, which comprises mixing the starting solid material selected from an alumina powder being able to be re-hydrated and a mixture of the alumina and other solid material with water, said starting solid material having an average particle size of 1 micron to 35 micron and a quarter deviation of particle distribution of not more than about 1.5, forming the mixture of a solid material and water into various shapes, re-hydrating the formed product by keeping it under wetted atmosphere or in water, and calcining the resulting re-hydrated product.

5 Claims, No Drawings

PROCESS FOR THE PRODUCTION OF LOW DENSITY ACTIVATED ALUMINA FORMED PRODUCT

This application is a continuation of application Ser. No. 254,449, filed on Apr. 15, 1981, now abandoned.

The present invention relates to a process for the production of a formed product of an activated alumina. More particularly, it relates to a process for the production of a formed product of an activated alumina having a low density and a large macro-pore volume and also an excellent abrasion resistance.

Activated alumina products are usually used for various utilities, for example as a drying agent, an absorbent, a catalyst, a catalyst carrier etc.

When the activated alumina product is used as a catalyst carrier, it is required to have properties whereby the catalyst carried thereon shows rapidly exhibits catalytic activity, the gases to be treated are rapidly diffused within the catalyst, and that the activated alumina produce has a small bulk density and a large pore volume, especially a large volume of macro-pore having a pore radius of 1000 Å or more. Moreover, when the activated alumina product is used as a catalyst carrier for cleaning exhaust gases in automobile, etc., it should also have an excellent mechanical strength (abrasion resistance). There is scarcely known an activated alumina product satisfying all these requirements.

It is known that an activated alumina product having such properties as mentioned above can be produced, for example, by mixing an alumina capable of being re-hydrated with a combustible fibrous organic additive having an average particle size of about 40 to 400μ, forming the mixture into various shapes, re-hydrating the formed product and then calcining it at a temperature of 450° to 650° C. (cf. Japanese Patent Laid Open Application No. 6006/1974 published on Jan. 19, 1974). According to this process, there can be obtained a formed product having a low bulk density and a large macro-pore volume, but the product is very expensive because of a specific additive that should be used. Thus, this process is uneconomical and further has drawbacks in that it is very difficult to control the calcination conditions in order to burn off the combustible organic additive having a large particle size and in that the calcination step requires a high temperature and a very long period of time, which results in lowering of the specific surface area of the activated alumina formed product.

Under the circumstances, the present inventors have intensively searched for an improvement of the process for the production of the desired activated alumina product having a low bulk density and a large macro-pore volume without using any substantial combustible material. As a result, it has been found that there can be obtained the desired activated alumina product satisfying all the requirements as mentioned above by using a starting material having specific ranges of an average particle size and a quarter deviation of particle distribution as mentioned hereinafter.

An object of the present invention is to provide an improved process for the production of an activated alumina formed product having a low bulk density and a large macro-pore volume. Another object of the invention is to provide an activated alumina formed product having various excellent properties. These and other objects and advantages of the present invention will be apparent to persons skilled in the art from the following description.

According to the present invention, the desired low density activated alumina formed product having a large macro-pore volume, i.e. having about 0.03 cc/g or more of a pore volume of the pore radius: 1000 Å or more and having an excellent abrasion resistance can be produced by mixing a solid material selected from an alumina power being able to be at least partially re-hydrated and a material containing the alumina with water, said starting solid material having an average particle size of about 1 micron to about 35 micron and a quarter deviation of particle distribution of not more than about B 1.5, forming the mixture into various shapes, re-hydrating the resulting formed product by keeping it under wetted atmosphere or in water, and then calcining the re-hydrated formed product.

The alumina capable of being re-hydrated used in the present invention includes all transition alumina capable of being re-hydrated which are obtained by subjecting alumina hydrate to thermal decomposition, for example ρ-alumina or amorphous alumina. Suitable alumina can industrially be produced by contacting an alumina hydrate (e.g. alumina trihydrate obtained by the Bayer process) with a hot gas of about 400 to 1,200° C. for several to 10 seconds or by maintaining the alumina hydrate under reduced pressure at a temperature of about 250° to 900° C. for about one minute to 4 hours, the alumina thus produced having a percentage loss of weight by calcination of about 0.5 to 15% by weight.

The alumina capable of being re-hydrated should contain in the starting solid material to be formed in an amount of from about 10 up to 100% by weight, preferably 20% by weight or more, more preferably 30% by weight or more, based on the total weight of the starting solid material to be formed. When the starting solid material contains the alumina of less than above range, the formed product does not show the desired strength required as a catalyst carrier even after re-hydrating the formed product.

The starting solid material other than the alumina capable of being re-hydrated is not specified but may be any conventional inorganic material useful as a catalyst carrier and any conventional material which is not burnt off during the calcination step for the activation of catalytically active components, for example, alumina not capable of being re-hydrated (e.g. α-alumina), silica, alumina hydrate, clay, talc, bentonite, diatomaceous earth, zeolite, cordierite, spodumene, titania, zirconia, silica sol, alumina sol, mullite, silica-alumina, etc. These other solid materials may be incorporated in an amount of less than 90% by weight, preferably less than 80% by weight, more preferably less than 70% by weight.

It is essential in the present invention that the starting solid materials have an average particle size of about 1 micron to about 35 micron and a quarter deviation of the particle distribution of not more than about 1.5, preferably 1.1 to 1.4. When the starting solid materials having such controlled particle size and distribution are used, there can be obtained the desired formed product (usually spherical) having a filling bulk density of 0.50 to 0.70 kg/liter, a volume of macro-pore having a pore radius: 1,000 Å or more of 0.03 cc/g or more, usually 0.03 to 0.30 cc/g, and an abrasion resistance of about 1.5% or less.

When the starting solid materials have an average particle size of more than 35 microns, the resulting product shows unfavorably a lower abrasion resistance, and on the other hand, when the starting solid materials have an average particle size of less than 1 micron, the resulting product shows a lower macro-pore volume. Additionally, when the starting solid materials have a quarter deviation of particle distribution of more than about 1.5, the resulting product shows unfavorably a larger bulk density and a lower macro-pore volume.

The process for the production of the starting alumina having the specified average particle size and quarter deviation is not specified, but it can be produced by any conventional processes, for example, by (i) hydrolyzing an aqueous sodium aluminate solution under a specific condition, (ii) classifying aluminum hydroxide, (iii) pulverizing aluminum hydroxide, (iv) calcining aluminum hydroxide, followed by pulverizing, and (v) calcining aluminum hydroxide, followed by classifying. Among these processes, the processes (i) and (ii) are preferable because of high yield and sharp particle distribution of the final product.

After regulating the average particle size and quarter deviation within the specified ranges, the starting alumina powder capable of being at least partially re-hydrated or the starting solid materials containing the alumina powder are mixed with water and then formed into various shapes such as sphere, tablet, pellet, bulk etc.

The thus formed alumina or solid material mixture is re-hydrated by keeping it under steam gas or steam-containing gas of a temperature of from room temperature to 250° C., preferably from 80° to 200° C., or in water or an elevated temperature, i.e. higher than room temperature, preferably higher than 80° C., for a period of time sufficient for giving the product excellent abrasion resistance and mechanical strength. The hydration is usually carried out for a period of time of from one minute to one week. When the re-hydration is carried out for a longer time and at higher temperature, the formed product is more solidified and shows larger mechanical stength. Thus, when the temperature is higher, the re-hydration can be completed within a shorter period of time. The formed product can also be re-hydrated by allowing it to stand in a sealed vessel at room temperature under atmospheric pressure for a long period of time.

The thus re-hydrated formed product is dried by conventional methods such as spontaneous drying, drying with hot air, drying in vacuum, etc. in order to remove the deposited moisture, and then calcined by heating at a temperature of from about 100° to 900° C., preferably 300° to 500° C., in order to remove water contained in the formed product, by which the alumina is activated.

In the present invention, the drying step subsequent to the re-hydration step as mentioned above is not essential, but it may be omitted by controlling the initial heating temperature in the calcination step so as to loosen the gradient of the rising temperature.

The activated alumina formed product thus obtained shows a specific surface area of about 200 m²/g or more. According to the present invention, it is not necessary to burn off any combustible material having a large particle size, contrary to the known process using a combustible fibrous material, and hence, the calcination of the re-hydrated formed product can be carried out at a lower temperature, which results in the excellent specific surface area of the product. Moreover, even though no combustible material is added, the product of the present invention shows excellent properties such as large macro-pore volume, low bulk density or abrasion resistance which are comparable or superior to the product produced by using a combustible material. Thus, the process of the present invention is valuable for the industrial production of the desired activated alumina formed product.

In the process of the production of the activated alumina formed product of the present invention, in order to increase the pore volume of the product, there may also optionally be added the conventional combustible materials, such as wooden waste, powdered cork, coal powder, activated carbon, charcoal, crystalline cellulose powder, starch, sucrose, gluconic acid, polyethylene glycol, polyvinyl alcohol, polyacrylamide, polyethylene, polystyrene, or the like.

The activated alumina formed product obtained by the present invention has excellent properties such as a large macro-pore volume, an excellent abrasion resistance (mechanical strength) and is useful for various utilities, such as a drying agent, an absorbent, a catalyst, or a catalyst carrier, particularly as a catalyst carrier for cleaning exhaust gases in an automobile etc.

The present invention is illustrated by the following Examples, but is not limited thereto.

The various properties mentioned herein are measured by the following methods.

(1) A quarter deviation:
It is calculated by the following formula:

$$\sqrt{\frac{d_{75}}{d_{25}}}$$

$d_{25}$: Particle size when the accumulated weight of the particles in the particle distribution curve is 25% by weight.

$d_{75}$: Particle size when the accumulated weight of the particles in the particle distribution curve is 75% by weight.

(2) Macro-pore volume (cc/g):
It means the total volume of pores having a pore radius: 1,000 Å or more which is measured by a mercury penetration method.

(3) Pressure strength (kg):
It is measured by a load break down test with a spring. That is, the test particle is put on a sample table and a load is added thereon with a spring to break down the particle. The weight of the load (kg), with which load the particle is broken down, is shown as the pressure strength.

(4) Total pore volume (cc/g):
This means a balance between the apparent volume (A) and the real volume (B) of one gram of the particle [i.e. the volume obtained by deducting the real volume (B) from the apparent volume (A)].

(5) Abrasion resistance (%):
It is measured by the method described in JIS K-1464.

EXAMPLE 1

Alumina trihydrate obtained by the Bayer process, which has an average particle size of 18 microns and a quarter deviation of particle distribution of 1.2, was instantly calcined in a hot gas at about 700° C. The thus obtained transition alumina had a percentage weight loss by calcination of 7.5% by weight, an average particle size of 17 microns and a quarter deviation of 1.2.

To the transition alumina (1 kg) was added water (about 700 g), and the mixture was formed into a spherical shape (diameter: 4-6 mm) with a pan granulator. The formed product was entered into a vessel with a cap and was re-hydrated by keeping it at 95° to 100° C. for 4 hours under sealing. Then, the alumina formed product was calcined in a calcining furnace at 400° C. for 2 hours.

The activated alumina formed product thus obtained had a filling bulk density of 0.58 kg/liter, a pressure strength of 18 kg, an abrasion resistance of 0.5%, a specific surface area of 320 m$^2$/g, total pore volume of 0.70 cc/g, and a macro-pore volume of a pore radius: 1,000 Å or more of 0.18 cc/g.

REFERENCE EXAMPLE 1

Alumina trihydrate obtained by the Bayer process was instantly calcined in a hot gas at about 700° C. to give a transition alumina having a percentage weight loss by calcination of 8.0% by weight, an average particle size of 40 microns, and a quarter deviation of 1.4.

The transition alumina was pulveralized with a shaking ball mill for 30 minutes to give an alumina powder having an average particle size of 18 micron and a quarter deviation of 1.7. To the alumina powder (1 kg) was added water (about 500 g), and the mixture was formed into a spherical shape (diameter: 4-6 mm) with a pan granulator. The formed product was re-hydrated and then calcined in the same manner as described in Example 1.

The alumina formed product thus obtained had a filling bulk density of 0.78 kg/liter, a pressure strength of 28 kg, an abrasion resistance of 0.4%, a specific surface area of 310 m$^2$/g, total pore volume of 0.42 cc/g, and a macro-pore volume of a pore radius: 1,000 Å or more of 0.01 cc/g.

REFERENCE EXAMPLE 2

The transition alumina obtained in Reference Example 1 was formed, re-hydrated and then calcined in the same manner as described in Reference Example 1 without pulverizing the alumina.

The alumina formed product thus obtained had a filling bulk density of 0.66 kg/liter, a pressure strength of 17 kg, an abrasion resistance of 3.0%, a specific surface area of 315 m$^2$/g, total pore volume of 0.55 cc/g, and a macro-pore volume of pore radius: 1,000 Å or more of 0.13 cc/g.

As is clear from the results in Reference Examples 1 and 2, when the starting alumina had a quarter deviation of particle distribution of more than 1.5, the resulting alumina formed product showed a larger filling bulk density, smaller pore volume and smaller macro-pore volume. Besides, when the starting alumina had a larger average particle size, the resulting alumina product showed inferior abrasion resistance.

EXAMPLE 2

Alumina trihydrate obtained by the Bayer process was calcined in a hot gas at about 850° C. to give a transition alumina having a percentage weight loss by calcination of 4.5% by weight, an average particle size of 8 micron and a quarter deviation of 1.2.

The transition alumina (1 kg) was mixed with cordierite powder having an average particle size of 8 micron (150 g) to give a transition alumina-cordielite powder mixture having an average particle size of 8 microns and a quarter deviation of 1.3.

To the powder mixture (1 kg) was added water (670 g), and the mixture was formed into a spherical shape (diameter: 2-4 mm) with a pan granulator. The formed product was entered in a vessel with a cap and partially re-hydrated by keeping at 80° C. for 2 hours under sealing. The resulting product was again re-hydrated by dipping it in a hot water at 95° to 100° C. for 4 hours under sealing. The re-hydrated alumina formed product was calcined at 500° C. for 2 hours.

The activated alumina formed product thus obtained had a filling bulk density of 0.62 kg/liter, a pressure strength of 12 kg, an abrasion resistance of 0.2%, a specific surface area of 220 m$^2$/g, total pore volume of 0.64 cc/g, and a macro-pore volume of pore radius: 1,000 Å or more of 0.13 cc/g.

EXAMPLE 3

The transition alumina (1 kg) obtained in Example 1 was mixed with an activated carbon having an average particle size of 10 micron (100 g) to give a transition alumina-activated carbon mixture having an average particle size of 8 microns and a quarter deviation of 1.4.

The mixture was formed and re-hydrated in the same manner as described in Example 2. The re-hydrated alumina formed product was calcined by keeping it at 350° C. for 4 hours and further at 600° C. for 4 hours, The activated alumina formed product thus obtained had a filling bulk density of 0.52 kg/liter, a pressure strength of 8 kg, an abrasion resistance of 0.3%, a specific surface area of 240 m$^2$/g, total pore volume of 0.86 cc/g, and a macro-pore volume of pore radius: 1,000 Å or more of 0.20 cc/g.

What is claimed is:

1. A process for the production of a low density formed product of an activated alumina having a large macro-pore volume being about 0.03 cc/g or more of a pore volume of pore radius: 1,000 521 or more and an excellent abrasion resistance, which comprises mixing about 10 to 100% by weight of a solid material selected from the group consisting of an alumina powder capable of being at least partially re-hydrated and a mixture of the alumina powder and a second material selected from the group consisting of α-alumina, silica, alumina hydrate, clay, talc, bentonite, diatomaceous earth, zeolite, cordierite, spodumene, titania, zirconia, silica sol, alumina sol, mullite, and silica-alumina with water, said solid material having an average particle size of 1 to about 35 microns and a quarter deviation of particle distribution of not more than about 1.5, forming the mixture of solid material and water, re-hydrating the formed product by keeping it under wetted atmosphere or in water, and calcining the resulting re-hydrated product.

2. A process according to claim 1, wherein the alumina powder capable of being at least partially re-hydrated is a member selected from the group consisting of ρ-alumina and amorphous alumina.

3. A process according to claim 1, wherein the second material is incorporated in an amount of less than 90% by weight based on the total weight of the starting solid material.

4. A process according to claim 1, wherein the re-hydration of the formed product is carried out by keeping it under steam gas or steam-containing gas of a temperature of from room temperature to 250° C. or in water of an elevated temperature.

5. A process according to claim 1, wherein the calcination of the re-hydrated formed product is carried out by heating it at a temperature of from 100° to 900° C.

* * * * *